United States Patent

Liu

[11] 4,033,051
[45] July 5, 1977

[54] EDUCATIONAL TOY

[76] Inventor: Hsing-Ching Liu, 3F, No. 213, Chuong Ching North Road, Sec. 4,, Taipei, China /Taiwan

[22] Filed: Aug. 8, 1975

[21] Appl. No.: 602,964

[52] U.S. Cl. .................................. 35/9 R
[51] Int. Cl.$^2$ ........................... G09B 3/06
[58] Field of Search ............ 35/9 R, 9 A–9 H, 35/22 R, 22 A

[56] References Cited
UNITED STATES PATENTS

| | | | |
|---|---|---|---|
| 2,760,274 | 8/1956 | Baker | 35/9 A |
| 3,008,246 | 11/1961 | Stall | 35/22 R |
| 3,343,278 | 9/1967 | Jermundson | 35/9 R |
| 3,362,103 | 1/1968 | Neumann | 35/9 R X |
| 3,535,796 | 10/1970 | Dean | 35/9 R |
| 3,845,958 | 11/1974 | Reinertsen | 35/22 A X |

*Primary Examiner*—Richard J. Apley

[57] ABSTRACT

An educational toy comprising a plurality of matched pairs of cartridges, each matched pair including a question cartridge displaying a question and an answer cartridge displaying the correct answer to the question, a body member having two compartments for receiving question and answer cartridges, respectively, mechanical sensing means extending to the compartments for sensing the shape of the inserted cartridges, and correct and wrong answer indicating means displaceable by the sensing means, the cartridges being configured such that a correct answer indication is only produced when a matched pair of cartridges is inserted in the said compartments.

4 Claims, 5 Drawing Figures

EDUCATIONAL TOY

The present invention relates to an educational toy, and more particularly, to an educational toy which is operable to indicate either a correct or a wrong answer.

The applicant has been granted U.S. Pat. No. 3,902,256 granted Sept. 2, 1975 entitled "Educational Quiz and Answer Toy with Action". Another U.S. Pat. application under Ser. No. 557,956, entitled "Educational Toy Clock with Action", was filed by the same applicant on Mar. 13, 1975. These prior toys, however, are more complicated in structure and should be actuated by battery. The production cost is thus relatively higher.

The educational toy according to the present invention comprises a plurality of matched pairs of cartridges, each matched pair including a question cartridge displaying a question and an answer cartridge displaying the correct answer to the question, a body member having two compartments for receiving question and answer cartridges, respectively, mechanical sensing means extending to the compartments for sensing the shape of the inserted cartridges, and correct and wrong answer indicating means displaceable by the sensing means, the cartridges being configured such that a correct answer indication is only produced when a matched pair of cartridges is inserted in the same compartments.

Hence, it is a primary object of the present invention to provide an afore-mentioned educational toy having relatively simple construction, low production cost and no substantial trouble.

Other objects and advantages will become apparent from the following description with reference to the accompanying drawings, in which.

Figure 1:
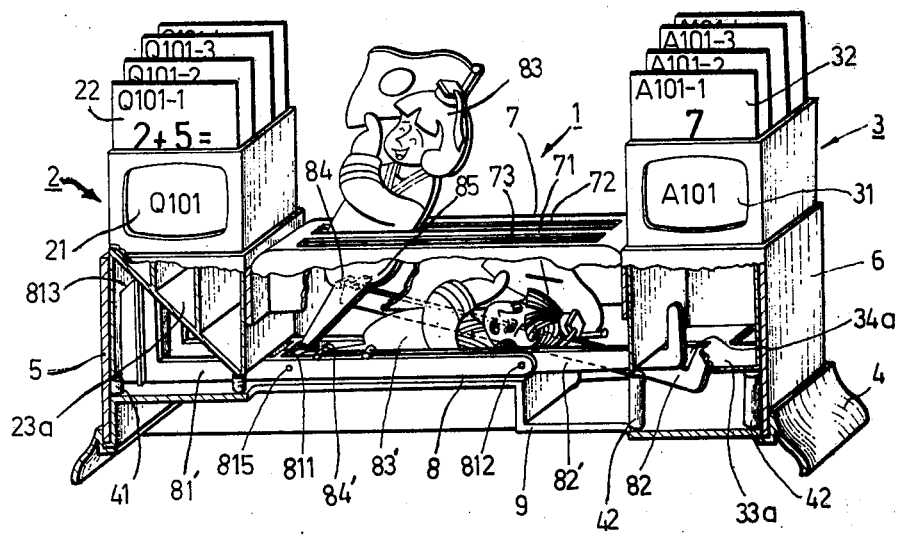
FIG. 1 is a perspective view of a preferred embodiment, with parts broken away.

Now, with reference to FIG. 1, the educational toy according to present invention mainly comprises a body assembly 1, a cartridge 2 for question cards 22, a cartridge 3 for answer cards 32 and a stand or base 4. The body assembly 1 consists of a housing containing a lever mechanism 8 and composed of two side chambers 5, 6 for receiving the cartridges a central portion 7, and a bottom plate 9. The said central portion 7 is divided by a longitudinal partition 71 into two compartments 72 and 73.

Figure 2:
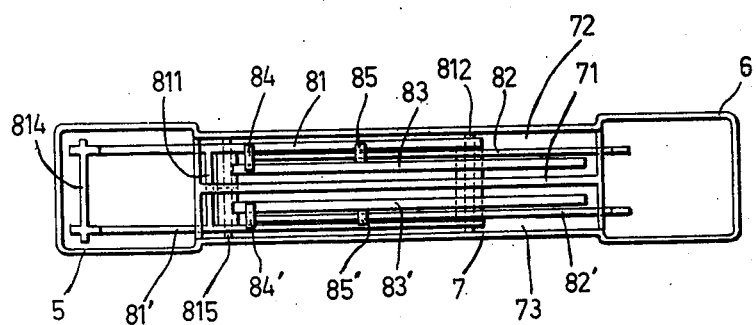
FIG. 2 is a top view of the body assembly without inserted cartridges.

Now referring to FIGS. 1 and 2, the said lever mechanism 8 consists of two spaced L-shaped brackets 81, 81', two L-shaped levers 82, 82', a correct answer indicator 83 and a wrong answer indicator 83'. The horizontal portions of the said L-shaped brackets 81, 81', are connected together by an integrally formed cross member 811 and by means of a first pivot pin 812 at the free end. The vertical portions of the said bracket 81, 81' are each provided with a sloping end surface 813 and are connected together by an integrally formed connecting plate 814. The said two L-shaped levers are pivotable about pin 812, and provided with a respective stop means 84, 84' at the horizontal free end. The said correct answer indicator 83 and wrong answer indicator 83' are pivotably secured at one end by means of a second pivot pin 815 which is provided between the said horizontal portions of two brackets 81, 81' close to the said cross member 811. Further, the said indicators 83, 83' are provided with a respective outward extending lug 85, 85'.

With afore-mentioned structure, it is so arranged that the said vertical portions of the said brackets 81, 81' are within, the side chamber 5 and can be made to slide from left to right, as viewed in FIG. 1 by insertion of a question cartridge. When the brackets 81 move laterally then so does the whole lever mechanism 8, so that the vertical portions of the L-shaped levers 82, 82' move within the chamber 6 by a corresponding amount. Normally, both the correct and the wrong answer indicators 83, 83' lie out of sight within the compartments 72 and 73 with their lugs 85, 85' in contact with the L-shaped levers 82, 82'. When an answer cartridge is inserted in the compartment 6 it will press down on one or other of the levers 82, 82', pivoting the lever clockwise, as viewed, thus raising the associated indicator 83, 83'.

The bottom plate 9 is provided with supports 41 and 42 arranged at four corners of both side chamber 5 and 6, respectively, for limiting insertion of the cartridges. 2 and 3.

Figure 3:
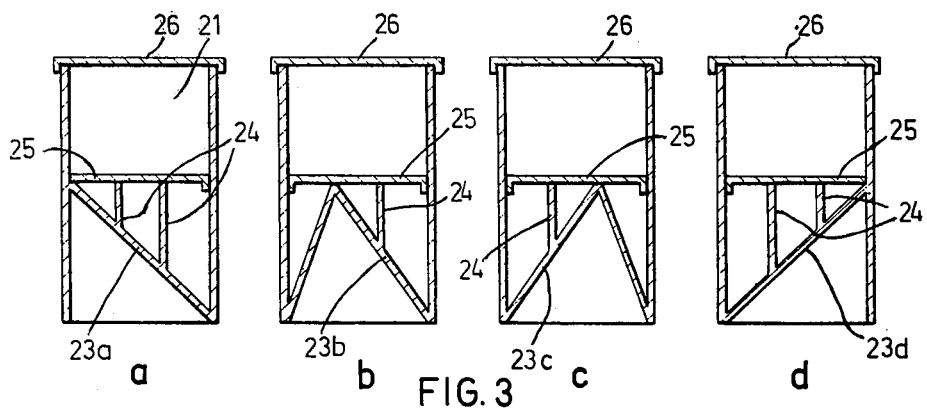
FIG. 3 is an elevational cross-section view depicting some variations of the inclined surface at the lower end of a plurality of a question cartridges.

As referred to FIG. 3, the question cartridge 2 comprises an upper section, and a lower section. The inner space 21 of the said upper section is intended to receive a series of question card 22 (see FIG. 1). the said lower section is provided with an inclined bottom surface 23 with one or more support members 24. The bottom surface 23 acts as a cam for laterally displacing the lever mechanism 8. The shape of the surface 23, as seen in FIG. 3, is varied from cartridge to cartridge. Said upper section and lower section are separated by a transverse plate 25 which will support the cards 22 inserted into the said upper section.

In the similar manner, the answer set 3 also comprises an upper section and a lower section. The inner space 31 of the said upper section for receiving with a series of corresponding answer card 32 (see FIG. 1). The said lower section is provided with a horizontal bottom wall 33 formed with apertures or openings 34. The openings 34 are varied to give a different pattern among different answer cartridges, as shown from FIGS. 4a to 4d. But the said patterns are predetermined according to corresponding question cartridges. A correct indication will only be given when the question and answer cartridges are matched; thus if the question cartridge is in accordance with FIG. 3a the answer cartridge of FIG. 4a only will yield a correct indication.

In use, a set of question and answer cards are placed in order in respective matching cartridges. In order to prevent confusion, it is preferably to mark on both the said cartridges and cards. For example, the series of question cards marked with a series number, such as, Q 101-1, Q 101-2, Q 101-3 . . . should be inserted into the question cartridge marked with a number of Q 101. And the series of answer cards marked with A 101-1, A 101-2, A 101-3 . . . should be inserted into the answer cartridge marked with a number of A 101 as shown in FIG. 1.

In the afore-mentioned manner, the question cartridges as shown from FIGS. 3a to 3d may be marked, for example, with Q 101, Q 102, Q 103, Q 104, respectively, and the answer cartridges as shown in FIGS. 4a to 4d may be marked with A 101, A 102, A 103, A 104, respectively.

Now, again referring to FIG. 1, for convenient representation, the cards 22 and 32 are shown as projecting from the cartridges 2 and 3, but they are actually inserted inside therein and closed by a cover 26, as shown in FIG. 3. The question and/or the answer on the cards 22, 32 appear from the show windows 21. Further, four cards 22 and 32 are shown in each case but more cards can be received in the cartridges 2 and 3.

When one selectively places the question cartridge 2 into the chamber 5, the surface 23a slides along the upper end on the vertical portions of brackets 81, 81' and hence the brackets 81, 18' together with the lever mechanism 8 move to the utmost left hand side. In order to answer the question "2 + 5 = ?" on card No. Q 101-1, if the child should select the answer cartridge A 101 with answer " 7 " on the card No. A 101-1 and place it into the chamber 6, then the opening 34a will allow the vertical portion of the lever 82' to stand still but the closed portion of the bottom 33 will press the vertical portion of the lever 82 downwards. So that the left hand side of the horizontal portion of the said lever 82 will pivot upwards. This movement will push the lug 85 and cause the correct answer indicator 83 to rise from the compartment 72, until stopped by the lug 84 provided on the horizontal free end of the lever 82. On the contrary, if a wrong answer in other cartridges 3b, 3c or 3d is selected, since the positions on the bottom walls 33b, 33c and 33d corresponding to the opening position 34a on bottom wall 33a are all solid the lever 82 will remain stationary and another lever 82' will be depressed to raise the wrong answer indicator 83'.

After one quiz has been made, the cartridges 2 and 3 should be taken out. Both the first cards Q 101-1 and A 101-1 will be pulled out from the front and inserted back behind their respective series of question and answer cards for next selection. It is obvious that with the corresponding pairs of question and answer sets, the correct answer indication will be always given, so that the pre-determined series of cards should be always kept in sequence, such as from A 101-1, A 101-2 . . . corresponding to Q 101-1, Q 101-2 . . . to avoid confusion, otherwise it is possible to give an correct answer indication but the answer is actually wrong. On the other hand, the cards should be carefully designed to prevent ambiguous answers and avoid the possibility that a correct answer will be indicated on mis-matched cartridges.

Figure 4:
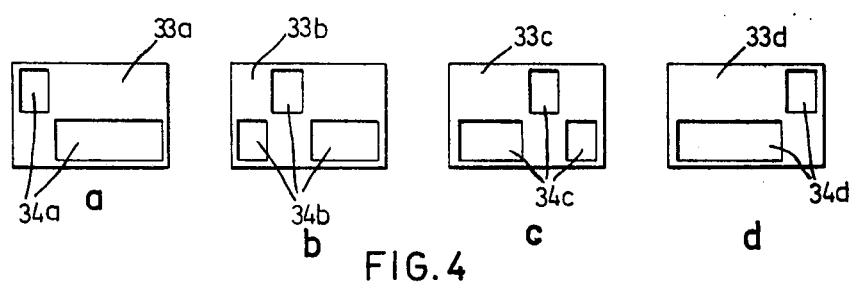
FIG. 4 is a bottom view depicting some corresponding variations of the answer cartridges.

In next quiz, when the question cartridge as shown in FIG. 3b is selected, since the surface 23b is different from the surface 23a, the vertical portion of the brackets 81, 81' will be moved towards the right hand to about one-third distance of the width of the chamber 5. The vertical portions of the levers 82, 82' will also move in the chamber 6 by an equal amount. In this case, only the corresponding answer cartridges set as shown in FIG. 4b will give an affirmative indication of answer. In the same manner, the answer cartridges as shown in FIGS. 4c and 4d only give a correct indication when used in conjunction with the question cartridges in FIGS. 3c and 3d respectively.

Figure 5:
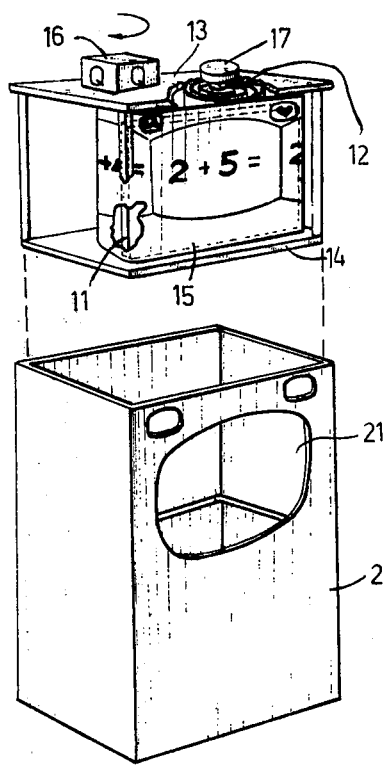
FIG. 5 is a perspective view of another embodiment of the question and answer cartridges using a continuous roll type.

The said question and answer cards series can be replaced by a continuous roll type, as shown in FIG. 5, which comprise a take-up shaft 11 and a return shaft 12, both rotatably secured between a top plate 13 and a bottom plate 14. A continuous roll 15 printed with a series of questions or answers is normally would around the said return shaft 12. Thereby the said roll 15 can be drawn by the operation of the knob 16, such as in clockwise, and wound up on the take-up shaft 11. The roll 15 can be returned by the operation of the knob 17, such as in direction. Accordingly, the shaft 11 should be provided with lock means used in Prior Art, for example, used in cameras for winding film. Further between the two shafts 11 and 12 there is preferably provided a support plate (not shown) to make the roll of neat appearance at the position appearing in show window. The cartridges 2 may have a small peep window to show the corresponding serial number of the question and answer roll. FIG. 5 illustrates a question cartridge only, but the answer cartridge is also of the same construction so that it is unnecessary to show and describe it in detail.

Further, the stand or base 4 is provided with a hollow portion in conformity with the configuration of the said body assembly 1. The base 4 may be so designed that the body assembly 1 adopts slight backwards inclination in order to be able to read the question and answer on the show windows 21 and 31 easily and conveniently.

An mentioned above, it is seen that the present invention provides a novel and educational toy with action to when indicate the answer is either correct or wrong, so as to increase the interest in learning. Further, the present educational toy is simple in construction and no electrical source is required to actuate it.

The above embodiments are given only for illustrative purposes and not by the way of limitation. Any variations and modifications evident to those skilled in the art will fall within the scope of the attached claims.

What I claim is:

1. An educational toy comprising a plurality of matched pairs of cartridges, each matched pair including a question cartridge displaying a question and an answer cartridge displaying the correct answer to the question, an elongated body member having two compartments for receiving questions and answer cartridges, respectively, arranged one at each end of the body member, mechanical sensing means extending to the compartments for sensing the shape of the inserted cartridges, and correct and wrong answer indicating means displaceable by the sensing means housed in a central section between the compartments comprising a pair of indicators of which one is arranged to rise upon insertion of a pair of cartridges into the said compartments, the cartridges being configured such that a correct answer indication is only produced when a matched pair of cartridges is inserted in the said compartments and an incorrect answer indication is only produced when a mis-matched pair of cartridges is inserted in the same compartments.

2. An educational toy as claimed in claim 1, wherein the said indicators are pivotably secured in the said central section and each is operated by a respective L-shaped lever extending into one compartment, the said L-shaped lever being pivotable to raise the associated indicator by insertion of a cartridge in said one compartment and being slidable within said one compartment by insertion of a cartridge in the other compartment.

3. An educational toy as claimed in claim 2, wherein the cartridge insertable in said other compartment is formed with an inclined lower surface for sliding the L-shaped levers and the cartridge insertable in said one compartment is formed with apertures whereby upon insertion of the latter cartridge into said one compartment one of the L-shaped levers is caused to pivot but not the other depending on the disposition of the apertures within said cartridge.

4. An educational toy as claimed in claim 1, wherein each cartridge includes a roll on which a plurality of questions or answers are inscribed, means for winding a re-winding the roll and a display window for enabling one frame on the roll to be seen.

* * * * *